(12) United States Patent
Siegfried et al.

(10) Patent No.: US 6,520,540 B1
(45) Date of Patent: Feb. 18, 2003

(54) TENSION SENSING SWITCH ASSEMBLY

(75) Inventors: Kenneth John Siegfried, Clarkston, MI (US); Lloyd Walker Rogers, Jr., Shelby Township, Macomb County, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/415,533

(22) Filed: Oct. 8, 1999

(51) Int. Cl.⁷ .............................................. B60R 22/48
(52) U.S. Cl. .................................................... 280/801.1
(58) Field of Search ........................... 280/801.1, 804, 280/806, 808, 802, 35, 803; 180/214, 274, 270, 65.2; 340/522, 687, 457, 52 E; 73/779, 876, 862.69

(56) References Cited

U.S. PATENT DOCUMENTS

| | | | |
|---|---|---|---|
| 3,618,378 A | | 11/1971 | Shull et al. |
| 3,784,972 A | * | 1/1974 | Hults ........................ 340/52 E |
| 3,817,093 A | | 6/1974 | Williams |
| 3,868,662 A | | 2/1975 | Russell, Jr. |
| 4,052,775 A | | 10/1977 | Gavagan et al. |
| 4,222,609 A | * | 9/1980 | Anderson ................... 297/468 |
| 4,424,509 A | * | 1/1984 | Andres et al. ............. 340/52 E |
| 4,574,911 A | * | 3/1986 | North ......................... 180/270 |
| 4,677,861 A | * | 7/1987 | Bartholomew ........... 73/862.54 |
| 4,742,886 A | * | 5/1988 | Sato ............................ 180/268 |
| 4,805,467 A | * | 2/1989 | Bartholomew .............. 116/203 |
| 4,943,087 A | | 7/1990 | Sasaki |
| 4,979,400 A | * | 12/1990 | Bartholomew .............. 116/203 |
| 5,060,977 A | * | 10/1991 | Saito ........................... 280/802 |
| 5,087,075 A | | 2/1992 | Hamaue |
| 5,133,425 A | | 7/1992 | Han |
| 5,181,739 A | | 1/1993 | Bauer et al. |
| 5,181,773 A | | 1/1993 | Colvin |

(List continued on next page.)

FOREIGN PATENT DOCUMENTS

WO      WO 99/55559     11/1999

OTHER PUBLICATIONS

"Magnetic Field Sensors for Magnetic Position Sensing in Automotive Applications", Joseph P. Heremans, General Motors Research and Development Corporation, Apr. 1, 1997.

*Primary Examiner*—Lesley D. Morris
*Assistant Examiner*—Paul Royal, Jr.
(74) *Attorney, Agent, or Firm*—Kathryn A. Marra

(57) ABSTRACT

A tension sensing switch assembly for a seat restraint system in a vehicle includes a housing for operative connection to the seat restraint system and a spring at least partially disposed in the housing for operatively cooperating with vehicle structure. The tension sensing switch assembly also includes a switch disposed in the housing and cooperable with the spring to indicate a first tension level and a second tension level in the seat restraint system when the spring is deflected.

17 Claims, 2 Drawing Sheets

U.S. PATENT DOCUMENTS

| | | | |
|---|---|---|---|
| 5,265,908 A | * 11/1993 | Verellen et al. | 280/801 A |
| 5,309,135 A | 5/1994 | Langford | |
| 5,364,129 A | 11/1994 | Collins et al. | |
| 5,454,591 A | 10/1995 | Mazur et al. | |
| 5,494,311 A | 2/1996 | Blackburn et al. | |
| 5,570,903 A | 11/1996 | Meister et al. | |
| 5,570,932 A | 11/1996 | Collins et al. | |
| 5,583,476 A | 12/1996 | Langford | |
| 5,590,904 A | * 1/1997 | Ellis et al. | 180/268 |
| 5,605,348 A | 2/1997 | Blackburn et al. | |
| 5,618,056 A | 4/1997 | Schoos et al. | |
| 5,636,864 A | 6/1997 | Hori | |
| 5,672,916 A | * 9/1997 | Mattes et al. | 307/10.1 |
| 5,728,953 A | 3/1998 | Beus et al. | |
| 5,732,974 A | * 3/1998 | Sayles | 280/805 |
| 5,775,618 A | 7/1998 | Krambeck | |
| 5,831,172 A | 11/1998 | Kidd | |
| 5,871,232 A | 2/1999 | White | |
| 5,960,523 A | * 10/1999 | Husby et al. | 24/303 |
| 5,965,827 A | 10/1999 | Stanley et al. | |
| 5,996,421 A | 12/1999 | Husby | |
| 6,081,759 A | * 6/2000 | Husby et al. | 701/45 |
| 6,161,439 A | 12/2000 | Stanley | |
| 6,209,915 B1 | 4/2001 | Blakesley | |
| 6,230,088 B1 | 5/2001 | Husby | |
| 6,301,977 B1 | * 10/2001 | Stojanovski | 73/862.393 |
| 6,363,793 B2 | * 4/2002 | O'Boyle | 73/828 |

\* cited by examiner

TENSION SENSING SWITCH ASSEMBLY

TECHNICAL FIELD

The present invention relates generally to seat restraint systems for vehicles and, more particularly, to a tension sensing switch assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment on inflatable restraint depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraint.

Although the above seat restraint system has worked, it is desirable to provide a switch for sensing tension in a seat restraint system of a vehicle. It is also desirable to provide a switch for a seat restraint system in a vehicle that allows a control module to determine the difference between either a child seat or a small occupant. It is further desirable to provide a switch for a seat restraint system in a vehicle that provides information used in determining inflatable restraint deployment levels.

SUMMARY OF THE INVENTION

It is, therefore, one object of the present invention to provide a switch assembly for sensing tension in a seat restraint system of a vehicle.

It is another object of the present invention to provide a dual resistance switch for sensing tension in a seat restraint system of a vehicle.

To achieve the foregoing objects, the present invention is a tension sensing switch assembly for a seat restraint system in a vehicle includes a housing for operative connection to the seat restraint system and a spring at least partially disposed in the housing for operatively cooperating with vehicle structure. The tension sensing switch assembly also includes a switch disposed in the housing and cooperable with the spring to indicate a first tension level and a second tension level in the seat restraint system when the spring is deflected.

One advantage of the present invention is that a tension sensing switch assembly is provided for a seat restraint system in a vehicle. Another advantage of the present invention is that the tension sensing switch assembly senses tension in the seat restraint system to help identify what is occupying the seat, either a child, child seat or low mass adult. Yet another advantage of the present invention is that the tension sensing switch assembly has a dual resistance switch that is diagnosable. Still another advantage of the present invention is that the tension sensing switch assembly provides information useful in determining deployment of an inflatable restraint system.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
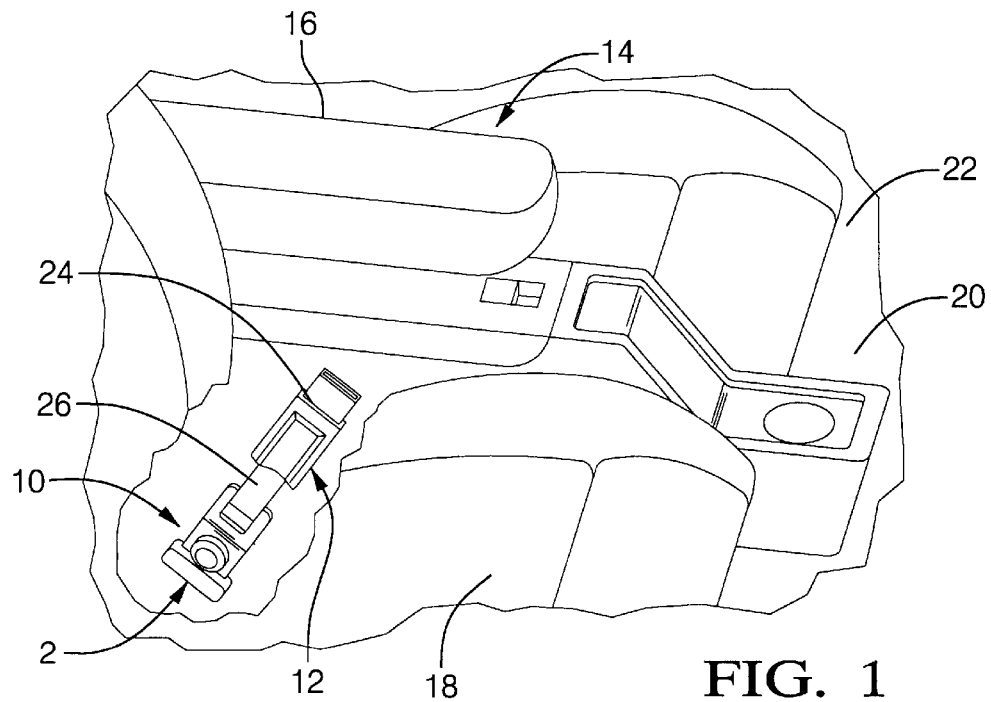
FIG. 1 is a perspective view of a tension sensing switch assembly, according to the present invention, illustrated in operational relationship with a seat restraint system of a vehicle.
Figure 2:
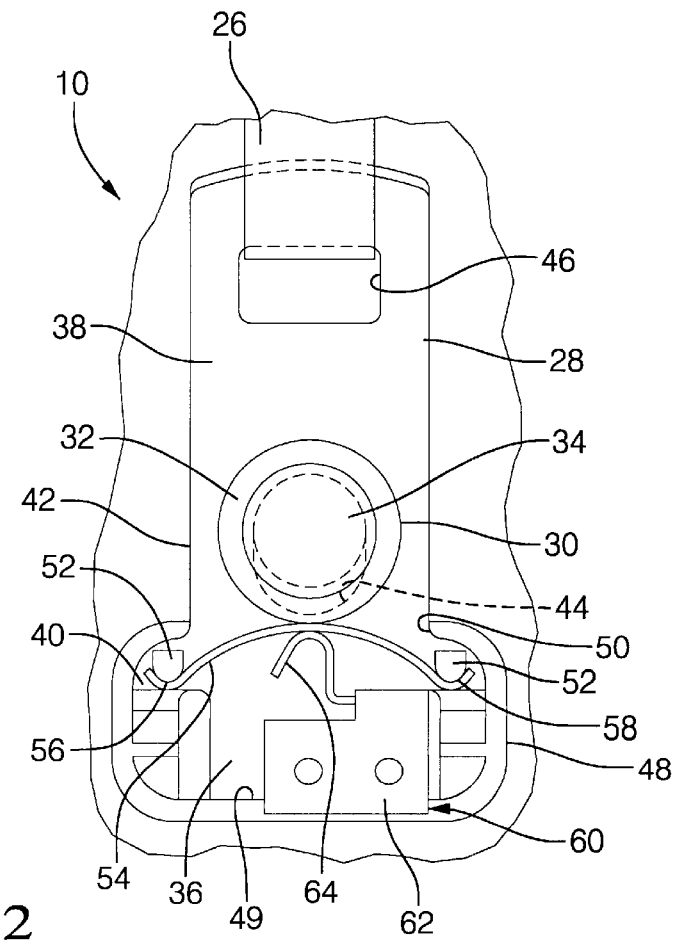
FIG. 2 is a fragmentary plan view of the tension sensing switch assembly of FIG. 1 illustrating a low tension condition.

Referring to the drawings and in particular FIGS. 1 and 2, one embodiment of a tension sensing switch assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row or third row seat for the vehicle 14.

Referring to FIGS. 1 and 2, the vehicle 14 includes the seat restraint system 12 for restraining an occupant (not shown) in the seat 18. The seat restraint system 12 includes a latch tongue or plate (not shown) connected to an end of either one of a lap belt, shoulder belt, or both (not shown) which have another end connected to a retractor (not shown). The seat restraint system 12 also includes a buckle assembly 24 and the tension sensing switch assembly 10 interconnected by suitable means such as belt webbing 26. The tension sensing switch assembly 10 is connected to the vehicle structure 20 in a manner to be described. It should be appreciated that the latch plate has an aperture extending therethrough and is engageable and disengageable with the buckle assembly 24. It should be appreciated that, except for the tension sensing switch assembly 10, the seat restraint system 12 and vehicle 14 are conventional and known in the art.

Figure 3:
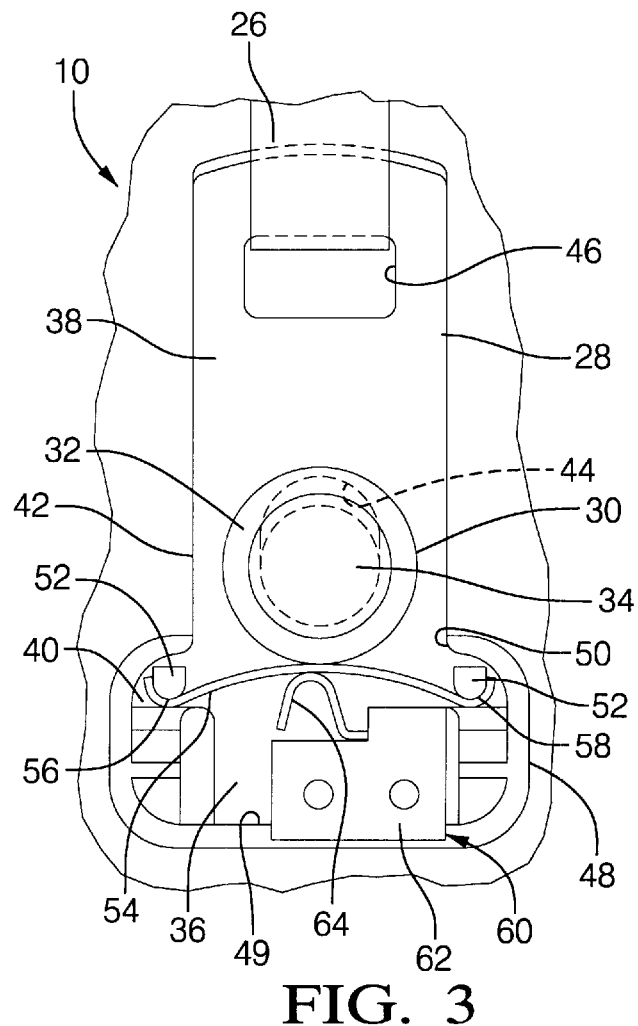
FIG. 3 is a view similar to FIG. 2 illustrating the tension sensing switch assembly in a high tension condition.

Referring to FIGS. 1 through 3, the tension sensing switch assembly 10, according to the present invention, includes an anchor plate 28 connected to vehicle structure by suitable means such as an anchor bolt 30. The anchor bolt 30 has a head portion 32 extending radially and a shaft portion 34 extending axially from the head portion 32. The shaft portion 34 is generally cylindrical in shape and the head portion 32 is generally circular in shape. The head portion 32 has a diameter greater than a diameter of the shaft portion 34. The shaft portion 34 extends through an aperture 44 to be described in the anchor plate 28 and the vehicle structure 20 and is secured in place by a nut (not shown). It should be appreciated that the anchor bolt 30 is conventional and known in the art.

The anchor plate 28 has a base portion 36 and a tongue portion 38 extending axially and upwardly from the base portion 36. The base portion 36 has a first portion 40 that is generally rectangular in shape. The base portion 36 also has a second portion 42 extending axially from the base portion 36. The second portion 42 has a width less than the first portion 40. The second portion 42 has an elongated aperture or slot 44 extending therethrough and axially to receive the anchor bolt 30. It should be appreciated that the second portion 42 of the base portion 36 is disposed between the head portion 32 of the anchor bolt 30 and the vehicle structure 20. It should also be appreciated that the anchor plate 28 is movable longitudinally relative to the anchor bolt 30.

The tongue portion 38 is generally rectangular in shape and has a width the same as the second portion 42 of the base portion 36. The tongue portion 38 includes an aperture 46 extending therethrough. The aperture 46 is generally rectangular in shape and receives one end of the belt webbing 26. The base portion 36 and tongue portion 38 are made of a metal material and formed as a monolithic structure being integral, unitary and formed as one-piece.

The tension sensing switch assembly 10 also includes a housing 48 disposed about and enclosing the first portion 40 of the base portion 36 of the anchor plate 28. The housing 48 has a cavity 49 with an aperture 50 at a forward end for a function to be described. The housing 48 has a pair of posts 52 disposed in the cavity 49 and being laterally spaced and extending upwardly adjacent the aperture 50. The housing 48 is generally rectangular in shape and made of a rigid material such as plastic. It should be appreciated that only one half of the housing 48 is illustrated in FIGS. 2 and 3.

The tension sensing switch assembly 10 includes a spring 54 at least partially disposed in the cavity 49 of the housing 48. The spring 52 is of a leaf type having a first end 56 disposed about one of the posts 52 in the housing 48 and a second end 58 disposed about the other post 52 in the housing 48. The spring 54 has a bowed or arcuate shape to cooperate with the shaft portion 34 of the anchor bolt 30. The spring 54 is made of a metal material. The spring 52 is tuned to a predetermined force for comfort. The spring 54 may also be of a coil spring type. It should be appreciated that the anchor bolt 30 deflects the spring 54 when the anchor plate 28 is moved relative to the anchor bolt 30.

Figure 4:
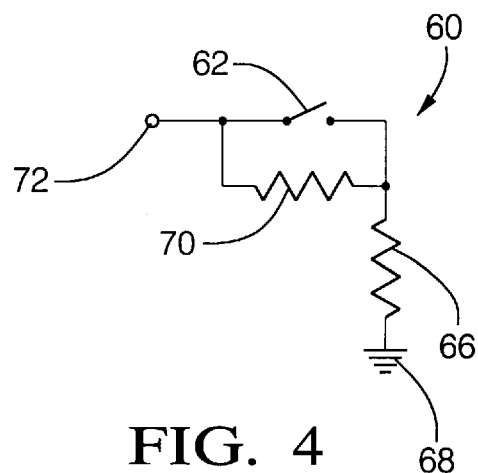
FIG. 4 is a schematic view of a circuit for the tension sensing switch assembly of FIG. 1.

Referring to FIGS. 2 through 4, the tension sensing switch assembly 10 includes an electrical circuit, generally indicated at 60, for diagnosing usage of the seat restraint system 12. The electrical circuit 60 includes a switch 62 for cooperating with the spring 54. The switch 62 is diagnosable and has two positions. Preferably, the switch 62 is of a micro type that is actuated by an arm or bail 64 pivotally connected to the switch 62. The switch 62 may also be of another suitable type such as a reed or Hall effect type. The bail 64 will move or pivot when the spring 54 engages the bail 64. The spring 54 moves the bail 64 from an open or first position with the switch 62 illustrated in FIG. 2 to a closed or second position illustrated in FIG. 3. It should be appreciated that the position of the bail 64 relative to the switch 62 changes the state of the switch 62, giving a different output current from the switch 46. It should also be appreciated that the bail 64 is preloaded by a spring (not shown) to return the bail 64 to the first position.

The circuit 60 also includes a first resistor 66 interconnecting one end of the switch 62 and ground 68. The first resistor 66 has a predetermined value such as one hundred ohms (100 Ω). The circuit 60 includes a second resistor 70 connected in parallel with the switch 46 with one end interconnecting the switch 62 and the first resistor 66 and another end connected to a source of power 72 such as a controller (not shown) of the vehicle 14. The second resistor 70 has a predetermined value such as three hundred ohms (300 Ω). The circuit 60 is mounted on a circuit board (not shown) connected to the housing 48 and is potted and connected by electrical leads or wires to the source of power 72 and ground 68.

In operation of the tension sensing switch assembly 10, the occupant buckles the seat restraint system 12 and the tension in the belt webbing 26 is lower than a predetermined load required to deflect the spring 54 as illustrated in FIG. 2. In this state, the tension sensing switch assembly 10 will send an open signal to the controller. Current from the source of power 72 flows through the second resistor 70 and first resistor 66 to ground 68. The flow of current through the both resistors 66 and 70 causes the controller to determine that a normal or large mass adult is present in the seat 18. It should be appreciated that the anchor plate 28 of the tension sensing switch assembly 10 is spring loaded to an initial position by the spring 54.

When a child seat (not shown) is placed in the seat 18 and the seat restraint system 12 is buckled, the seat belt webbing 26 is cinched to pull the child set tightly in to the seat 18. The tension in the seat belt webbing 26 is above the predetermined level to deflect the spring 54 as illustrated in FIG. 3. In this state, the deflection of the spring 54 causes the switch 62 to change states, sending a closed contact signal to the controller. Current from the source of power 72 flows through the switch 62 and first resistor 66 to ground 68. The flow of current through only one resistor 66 causes the controller to determine that a child seat is present in the seat 18. Also, if the controller receives no signal from the switch 62, the controller determines that there is an unplugged wiring connector (not shown) to the seat restraint system 12. Further, if the controller receives a signal from the switch 62 approximately equal to the current from the source of power 72, the controller determines that there is a shorted wiring connector to the seat restraint system 12. It should be appreciated that the when the belt webbing 26 is tensioned past a predetermined force, the spring 54 will deflect or travel approximately three millimeters (3.0 mm), causing the switch 62 to change states. It should be appreciated that an audible tone or visual indication may be provided when the tension in the belt webbing 26 is increased above the predetermined level.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing switch assembly for a seat restraint system in a vehicle comprising:

a movable anchor plate having a first end and extending axially to a second end connected to seat restraint webbing of the seat restraint system;

a housing connected to said first end of said anchor plate and having an opening at one axial end;

a spring disposed in and connected to said housing and having a portion extending to said opening for operatively cooperating with vehicle structure; and a switch disposed in said housing and cooperable with said spring to indicate a first tension level and a second tension level in the seat restraint system when said spring is deflected by axial movement of said anchor plate.

2. A tension sensing switch assembly as set forth in claim 1 wherein said switch comprises either one of a micro switch, reed switch and hall effect switch.

3. A tension sensing switch assembly as set forth in claim 1 wherein said housing has a cavity with an aperture communicating with said cavity, said spring being at least partially extending through said aperture.

4. A tension sensing switch assembly as set forth in claim 1 wherein said spring is either one of a leaf spring and coil spring tuned to a predetermined force.

5. A tension sensing switch assembly as set forth in claim 1 including a resistor in parallel with said switch and interconnecting a source of power and ground.

6. A tension sensing switch assembly as set forth in claim 1 including a resistor in series between said switch and ground.

7. A tension sensing switch assembly as set forth in claim 1 wherein said spring is adapted to be disposed adjacent an anchor bolt of the vehicle structure.

8. A tension sensing switch assembly as set forth in claim 7 wherein said anchor plate includes an elongated slot for receiving the anchor bolt, said spring being at least partially disposed in said housing for engagement with the anchor bolt.

9. A tension sensing switch assembly as set forth in claim 1 including a movable bail cooperating with said switch and said spring.

10. A dual resistance tension sensing switch assembly for a seat restraint system in a vehicle comprising:

an anchor plate having a first end and extending axially to a second end connected to seat restraint webbing of the seat restraint system, said anchor plate having a slot therein disposed between said first end and said second end;

an anchor bolt extending through said slot in said anchor plate and adapted to be connected to vehicle structure, said anchor plate being movable relative to said anchor bolt;

a housing connected to said first end of said anchor plate and having an opening at one axial end;

a spring disposed in said housing and connected to said housing and having a portion extending to said opening to cooperate with said anchor bolt as said anchor plate is moved; and a switch disposed in said housing and cooperable with said spring, said spring being disposed adjacent said anchor bolt, said anchor bolt deflecting said spring when said anchor plate is moved axially relative to said anchor bolt to open and close said switch to indicate a first tension level and a second tension level in the seat restraint system.

11. A dual resistance tension sensing switch assembly as set forth in claim 10 wherein said switch comprises one of a micro switch, reed switch and Hall effect switch.

12. A dual resistance tension sensing switch assembly as set forth in claim 10 wherein said spring is either one of a leaf spring and coil spring.

13. A dual resistance tension sensing switch assembly as set forth in claim 10 wherein said housing has a cavity with an aperture communicating with said cavity, said spring being at least partially extending through said aperture.

14. A dual resistance tension sensing switch assembly as set forth in claim 10 including a first resistor interconnecting said switch and ground.

15. A dual resistance tension sensing switch assembly as set forth in claim 14 including a second resistor interconnecting said first resistor and a source of power and said switch.

16. A dual resistance tension sensing switch assembly as set forth in claim 10 including a movable bail cooperating with said switch and said spring.

17. A seat restraint system for a vehicle comprising:

a seat restraint webbing;

an anchor plate having a first end and extending axially to a second end, said second end having an aperture therein to receive one end of said seat restraint webbing, said anchor plate having a slot therein disposed between said first end and said second end;

an anchor bolt extending through said slot in said anchor plate and adapted to be connected to vehicle structure and allowing movement of said anchor plate relative to said anchor bolt;

a housing connected to said first end of said anchor plate and having an opening at one axial end;

a spring disposed in said housing and connected to said housing and having a portion extending to said opening and cooperating with said anchor bolt;

a switch disposed in said housing;

a movable bail disposed adjacent said spring and cooperating with said switch and said spring, said anchor bolt deflecting said spring when said anchor plate is moved axially relative to said anchor bolt to move said bail to open and close said switch to indicate a first tension level and a second tension level in said seat restraint system.

* * * * *